(No Model.)
C. F. BEEBE.
BICYCLE SUPPORT.
No. 485,572. Patented Nov. 1, 1892.
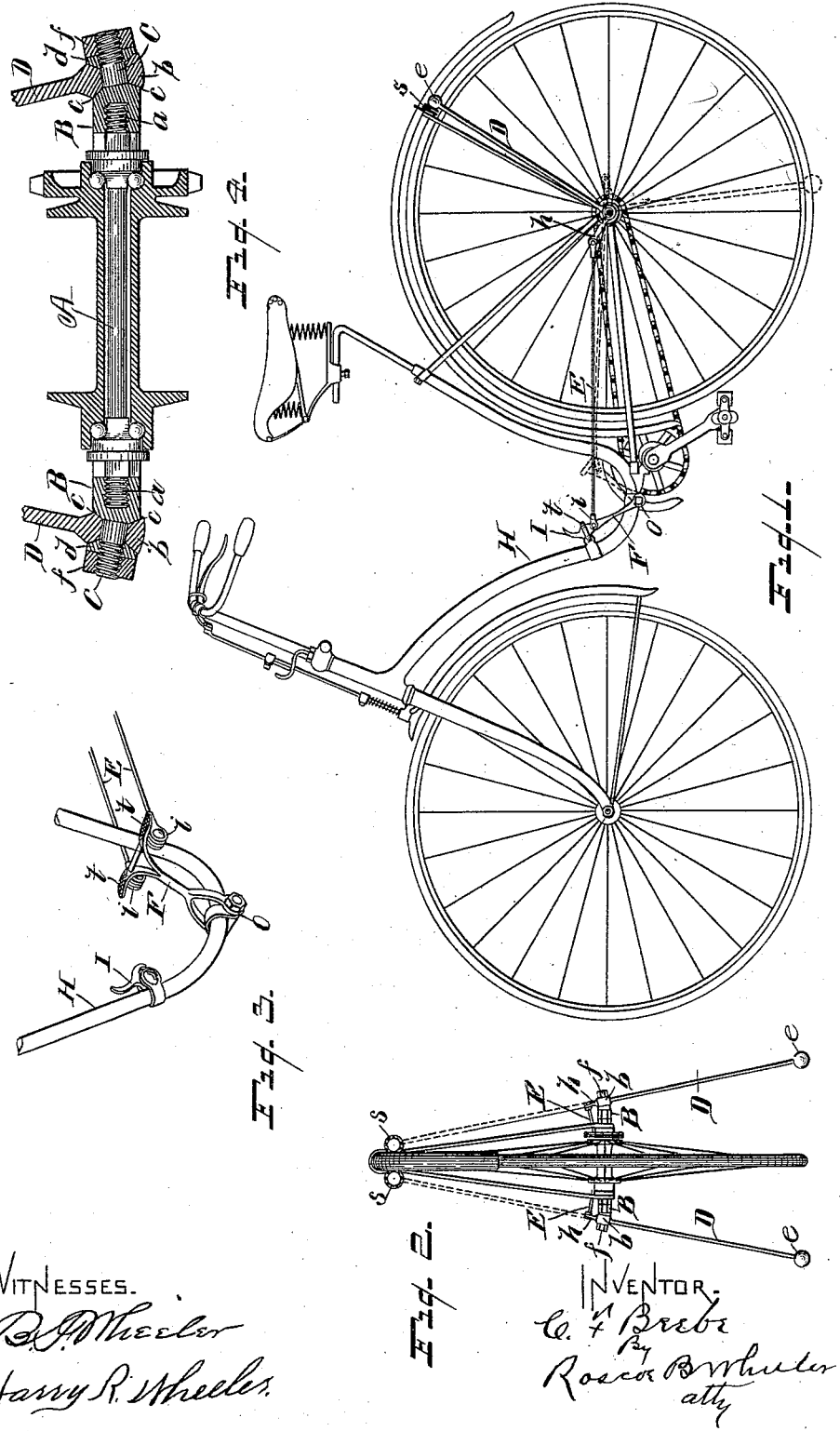

United States Patent Office.

CHARLES F. BEEBE, OF ORION, ASSIGNOR OF ONE-HALF TO OTIS F. KNOWLES, OF OXFORD, MICHIGAN.

BICYCLE-SUPPORT.

SPECIFICATION forming part of Letters Patent No. 485,572, dated November 1, 1892.

Application filed September 10, 1891. Serial No. 405,252. (No model.)

*To all whom it may concern:*

Be it known that I, CHARLES F. BEEBE, a citizen of the United States, residing at Orion, in the county of Oakland and State of Michigan, have invented certain new and useful Improvements in Stand Attachments for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bicycle-stands; and it consists in a certain construction and arrangement of parts, as hereinafter fully set forth, the essential features of which are pointed out particularly in the claims.

The objects of the invention are to provide means adapted to be attached to a bicycle that will support the bicycle and prevent its falling over when not in motion, enabling the machine to be mounted while it is standing still, or stopped at any time without the rider being obliged to dismount, and also serving as a stand for the bicycle when not in use. These objects are attained by the mechanism illustrated in the accompanying drawings, in which—

Figure 1 is a side elevation of a bicycle embodying my improved features. Fig. 2 is a rear elevation of the hind wheel, showing the position of the diverging braces or legs when supporting the wheel. Fig. 3 is an enlarged detail in perspective of a portion of the backbone of the machine, showing the tread-lever and its locking-catch mounted thereon and the connecting-rods attached to said lever, by means of which the supporting-legs are operated. Fig. 4 is an enlarged longitudinal section through the rear hub and axle, showing the manner of attaching the supporting-legs to the outer ends of said axle.

Referring to the letters of reference, A designates the rear axle, as shown in Fig. 4, upon the outer threaded ends $a$ of which the extension-nuts B are screwed, said nuts being provided with the stem or journal C, that projects outward and upward at an angle to the horizontal line of the axle.

D designates the supporting legs or braces, which are provided at one end with the hub $b$, having an aperture therein through which passes the journal C, the edges of said aperture being beveled to receive the conical shoulder $c$ of the nut B on the inner side and the cone washer $d$ on the outer side, said washer being screwed onto the threaded end of said journal and all of said parts being retained in place by the set-nut $f$, whereby the legs D are pivotally mounted on said stems or journals C. The other ends of the legs B are provided with a rubber knob or ball $e$, which when the legs are thrown down in the position shown in Fig. 2 will bear upon and adhere to the surface and prevent the slipping of said legs. As an additional security against slipping, the balls $e$ may be provided with a spur or point embedded therein, which when weight is thrown on said balls will project therethrough and into the surface on which the balls rest, as will be readily understood.

Formed integral with the hubs of the legs D are the arms $h$, as shown in Figs. 1 and 2. Said arms extend nearly at right angles to said legs, and their free ends are pivotally attached to the rear ends of the connecting-rods E, which extend forward on each side of the rear wheel and are pivoted at their forward ends to the tread-lever F, as shown at $i$ in Figs. 1 and 3, the bifurcated lower end of said lever sitting astride of the backbone H, to which it is pivotally coupled, as shown at $o$, the upper end of said lever being provided with the laterally-extending serrated foot-plates $t$, connected by the cross-rod $u$, which is adapted to be engaged by the catch I, also secured to the backbone of the machine, whereby the lever F when thrown forward is locked and retained in place, as shown in Fig. 1. It will now be apparent that when the parts are in the position shown in Fig. 1, and it is desired to stand the machine, by disengaging the catch from the lever F the supporting-legs will by force of gravity swing down to the position shown in Fig 2 and by dotted lines in Fig. 1. Said legs as they swing down are caused to diverge by means of the angle of the stems C, on which they are journaled, whereby the wheel is braced laterally and prevented from falling over when standing still. The rider may accomplish this by disengaging the catch I from the lever F with the foot. The brace-legs will then swing down and when the machine has been brought to a stop will support it, enabling the rider to remain on the seat while the machine is stationary, from which position the rider can again start ahead, and after the machine has gained sufficient impetus by throwing the lever F forward with the foot the legs D may be swung upward out of the way, the angle of the stems C on which they are journaled causing their free ends to converge as they swing upward until arrested by the stops s, secured to the fender-rod, as shown in Fig. 1 and by dotted lines in Fig. 2, in which position they lie close to the fender-rod and are retained by the catch I, which engages and locks the lever F. This improved device also forms a perfect stand for the machine when dismounted, as by swinging down the supporting-legs and setting the brake it may be made to stand wherever desired.

While I have shown and described the swinging legs as attached to the rear axle, I do not wish to limit myself to this particular construction, as they may be attached to other parts of the machine-frame and operated in the same manner, and instead of operating the legs by the foot-lever, as shown, I may extend the connecting-rods upward to the under side of the seat, so as to operate them from that point by hand, or extend said rods forward, so as to operate said legs from the handle-bar, without departing from the spirit of my invention.

Having thus fully set forth my invention, what I claim as new, and desire to secure by Letters Patent, is—

1. In a bicycle, the combination of the frame, the rear axle supported thereby, the extension-nuts having the angle-journal formed integral therewith, said nuts being secured on the outer ends of said axle, the swinging legs having the arms secured to the hubs thereof mounted on said journals, the operating-lever mounted on the frame, and the connecting-rods coupled to the arms of said legs and to the operating-lever, as set forth.

2. In a bicycle, the combination of the frame, the rear axle supported thereby, the extended angle-journals secured on the outer ends of said axle, the swinging legs having arms secured to the hub thereof mounted on said journals, said legs having a rubber ball at their free ends, the operating-lever mounted on the frame, and the connecting-rods coupled to the arms of said legs and to the operating-lever, substantially as specified.

In testimony whereof I affix my signature in presence of two witnesses.

CHARLES F. BEEBE.

Witnesses:
B. F. WHEELER,
E. S. WHEELER.